Nov. 27, 1962  B. G. WITTE  3,065,872
ELEVATING MOLD DUMP
Filed Jan. 14, 1960  4 Sheets-Sheet 1

INVENTOR.
BERNARD G. WITTE
BY
ATTORNEYS

Nov. 27, 1962   B. G. WITTE   3,065,872
ELEVATING MOLD DUMP
Filed Jan. 14, 1960   4 Sheets-Sheet 2
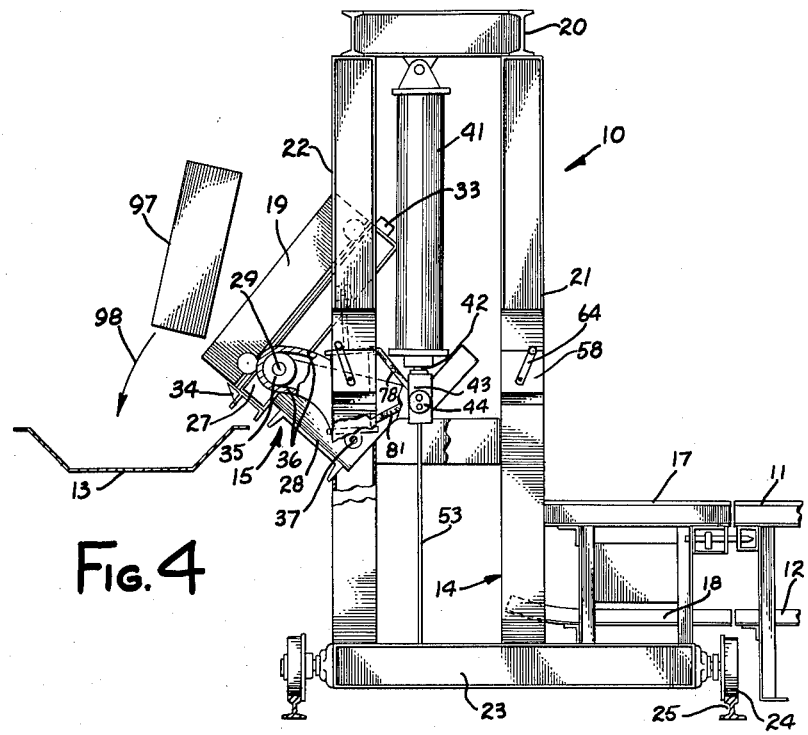
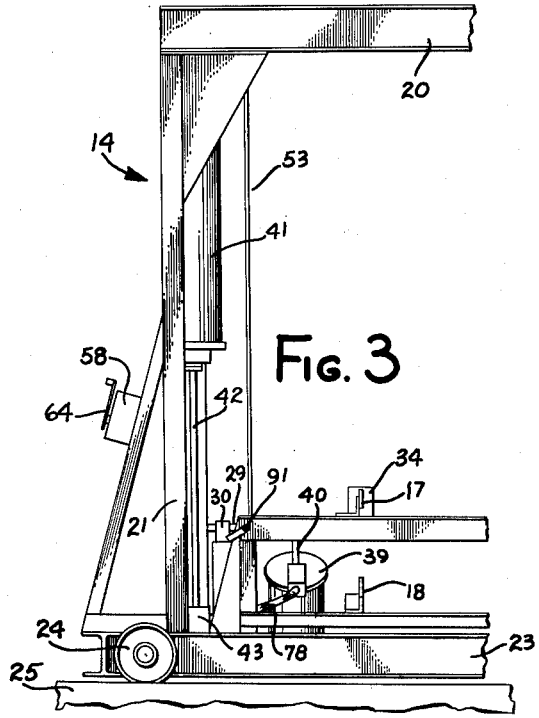
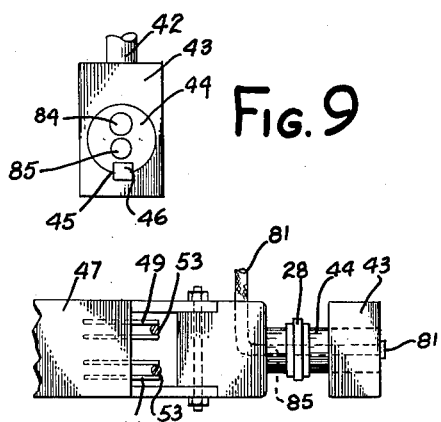
INVENTOR.
BERNARD G. WITTE
BY
ATTORNEYS

INVENTOR.
BERNARD G. WITTE
BY
ATTORNEYS

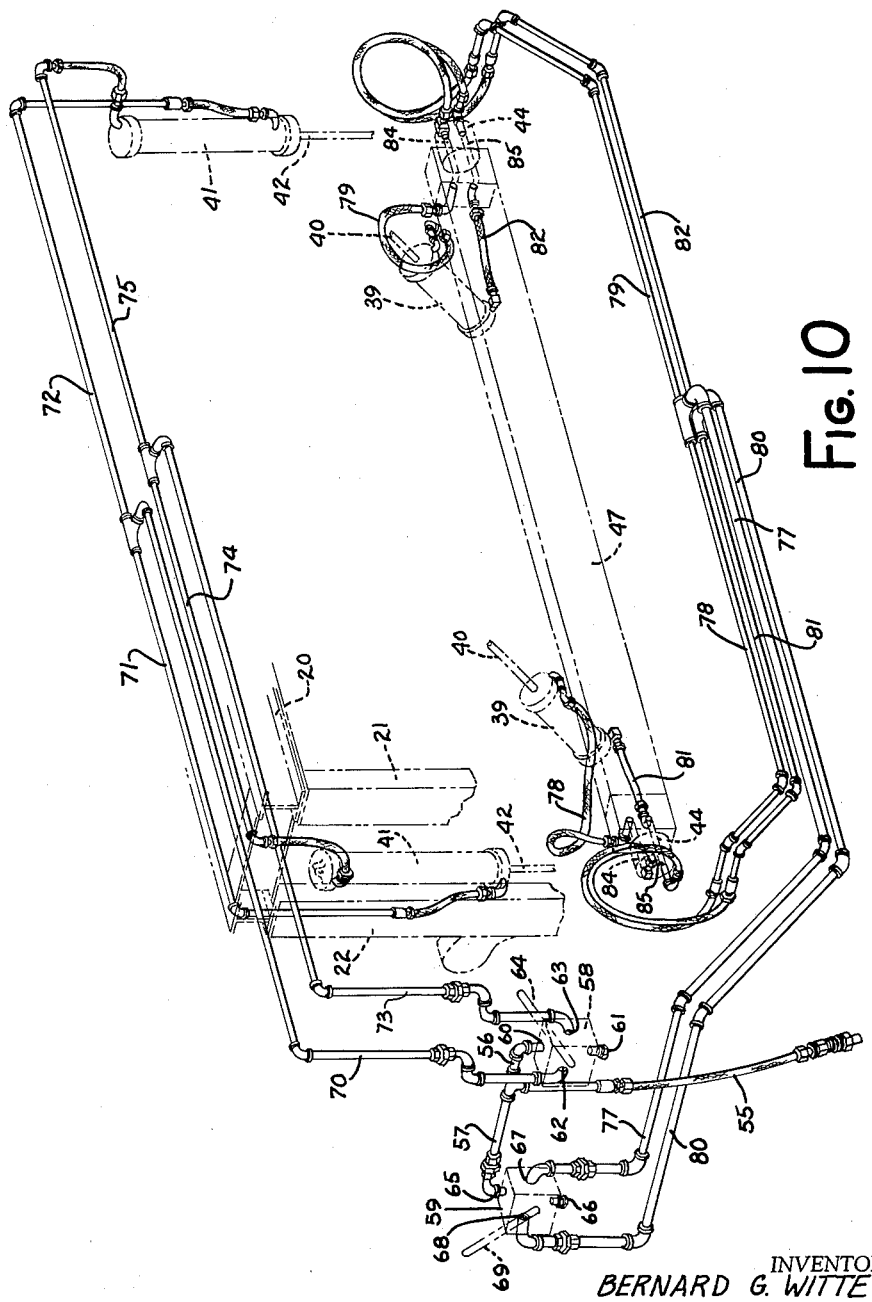

United States Patent Office 3,065,872
Patented Nov. 27, 1962

3,065,872
ELEVATING MOLD DUMP
Bernard G. Witte, Newaygo, Mich., assignor to Newaygo Engineering Company, Newaygo, Mich., a corporation of Michigan
Filed Jan. 14, 1960, Ser. No. 2,365
9 Claims. (Cl. 214—707)

This invention relates to foundry equipment. More particularly, it relates to a movable, pallet car elevating mold dump for receiving at a foundry mold dumping station a loaded pallet car, elevating it to a position above a conveyor, dumping the load and then placing said pallet car in unloaded condition on a car return track at said station.

In large scale foundry operations, it is not uncommon to have a number of such production lines arranged parallel to one another and usually transversely of the building. Moreover, each line will usually involve a number of shell mold and tray cars. The conveyor will usually be found at the end of the production lines arranged longitudinally in relation to the building and transversely to the production lines.

The problem to which this invention is directed is that of unloading the poured molds from the cars onto the conveyor and then placing the unloaded cars on the return tracks.

One approach to the problem is a stationary mold dumping apparatus such as shown in U.S. Patent No. 2,830,716, Murphy. This approach, however, is not practical when a large number of foundry production lines are involved. It is not practical because such equipment, being stationary, must be installed at each mold dumping station of each production line. This, obviously, involves a large capital investment. It is also impractical because the rate of production on each line and the times of production on each line vary considerably in most foundry operations. Hence, the actual time of operation of such dumping equipment may be quite small. Yet, the auxiliary equipment necessary for the operation of each individual dumping machine must usually be kept in readiness.

A machine such as shown in the Murphy patent is also impractical where the conveyor at any mold dumping station is, for one reason or another, at a higher elevation than the pallet car delivery track. In such case, the mold must be both elevated and moved horizontally from the delivery track to the conveyor in order to place the mold into the conveyor. This function the machine of the Murphy patent is unable to perform.

An object of this invention is to provide a pallet car elevating, mold dumping machine.

A specific object of this invention is to provide an elevating mold dumping machine which can be moved from one foundry dumping station to another.

These and other objects which may appear as this specification proceeds are achieved by this invention which shall be described with reference to the drawings which form a material part of the disclosure. A brief listing of the drawings follows.

FIG. 3 is a front or car receiving end view of the left-hand portion of the machine of FIG. 1, which view is taken as indicated by the sectioning planes 3—3 of FIG. 2 but with the pallet car removed.

FIG. 4 is a side view of the mold dumping machine of FIG. 1 with pallet car thereon shown in load dumping position and with a mold falling off therefrom and showing a portion of the outer structure of the machine removed to reveal inner structure.

FIG. 8 is a bottom view of an end portion of the lift mechanism, which view is taken as indicated by the plane 8—8 of FIG. 6.

FIG. 9 is a view of the end of the end portion shown in FIG. 8, which view is taken as indicated by the lines 9—9 of FIG. 6.

FIG. 10 is a perspective view of a fluid pressure system for actuating the lift mechanism of the machine, which view illustrates in phantom pertinent portions of the machine.

In general, the drawings broadly disclose a mold dumping machine based on the concept of a suspended table with a track thereon for receiving a loaded pallet car from a loaded pallet car delivery track. Involved in this broad concept are the concepts of means for lifting the table from its car receiving position, means for tilting the car receiving or front end of the table upwardly so as to dump the load rearwardly from a pallet car on the table, means for keeping the pallet car on the table while the front end of the table is so tilted, means for returning the table to its car receiving position and means for tilting the car receiving or front end of the table downwardly so as to bring the table track into registry with a car return track.

Structure

Specifically, the drawings disclose a mold dumping machine 10 in position at a mold dumping station at the end of a foundry production line. Leading to, and terminating at, the mold dumping station is a loaded pallet car delivery track 11. Leading away from, and commencing at, the mold dumping station is an unloaded pallet car return track 12. The car return track 12, it will be observed, is disposed below, and spaced from, the car delivery track 11 and gently slopes downwardly toward the mold forming station.

Figure 2:
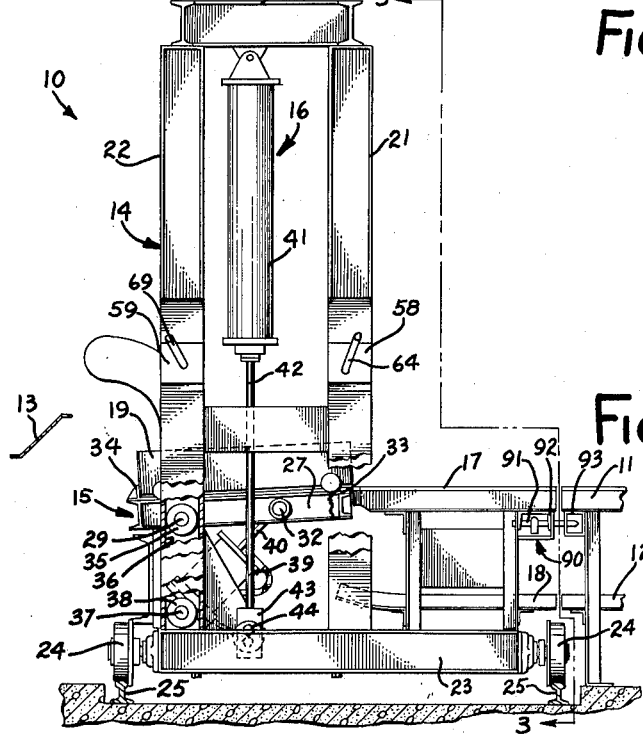
FIG. 2 is a side view of the mold dumping machine of FIG. 1, at a foundry mold dumping station, which view shows the machine with portions of the external structure removed to reveal internal structure and a pellet car without a load but in position in the machine.
Figure 5:
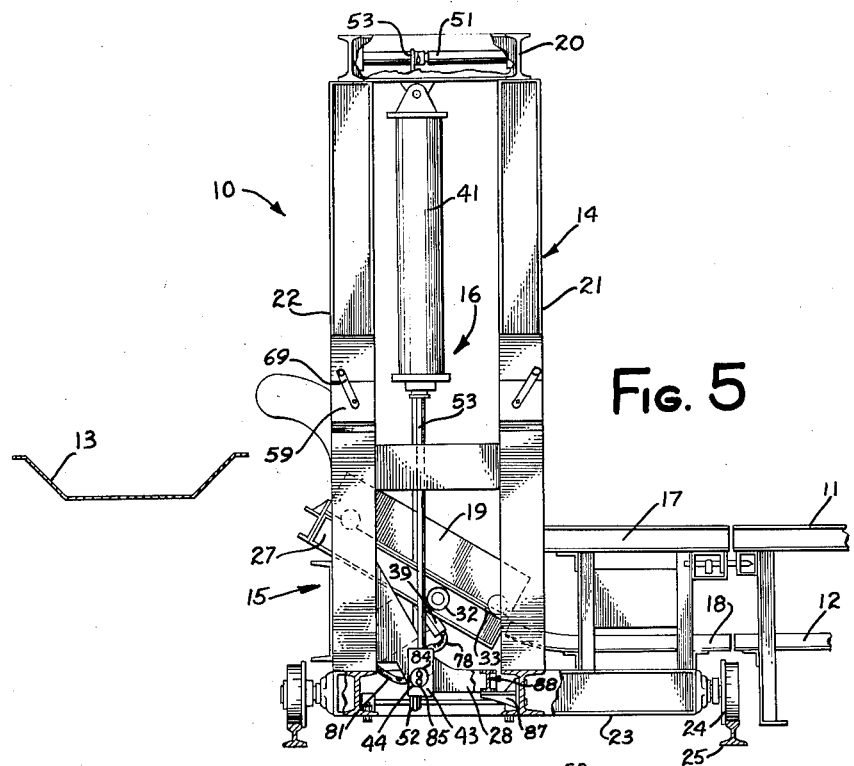
FIG. 5 is another side view of the mold dumping machine of FIG. 1 but with a pallet car thereon shown in car return position, which view likewise shows portions of external structure removed to reveal inner structure.

The front or receiving end of the machine 10 faces the ends of the car delivery track 11 and the car return track 12. The back of the machine faces a generally horizontally and transversely disposed, conveyor 13 which, as partially shown in FIG. 2 and fully shown in cross section in FIGS. 4 and 5, is at a higher elevation than the end of the car delivery track 11. The mold dumping machine 10 comprises a supporting frame work structure 14, an elevatable platform structure 15, a platform lifting and lowering mechanism 16, an auxiliary car delivery track 17 and an auxiliary car return track 18. For purposes of illustration, there is also shown in the drawings a pallet car 19 on the platform structure 15.

The supporting frame work assembly 14 comprises an overhead beam structure 20, on each side a front column structure 21 and a back column structure 22, and a bottom beam structure 23. Rotatably mounted on the front and back of the bottom beam structure 23 adjacent each side end thereof are flanged wheels 24 which ride on the rails of a track 25 for transverse movement relative to the car delivery and return tracks 11 and 12 from one mold dumping station to another. Mounted on the supporting framework assembly 1 are the lift mechanism 16, the auxiliary car delivery track 17 and the auxiliary car return track 18.

The platform structure 15 comprises a table 27 and a base 28. The rear portion of the platform 27 is mounted on a horizontally disposed, rotatable shaft 29 which is secured to the base 28 by a shaft mounting 30 adjacent one end thereof and a shaft mounting 31 adjacent the other end thereof. A horizontally disposed pivot shaft 32, positioned forwardly of the rotatable shaft 29 and mounted on the underside of the table 27 is also provided. On top of the table 27 are mounted the rails of a pallet car track 33. At the back of each rail of the track 33 there is provided a stop member 34 which functions to limit the extent of rearward movement of a pallet car on the platform 27.

Figure 1:
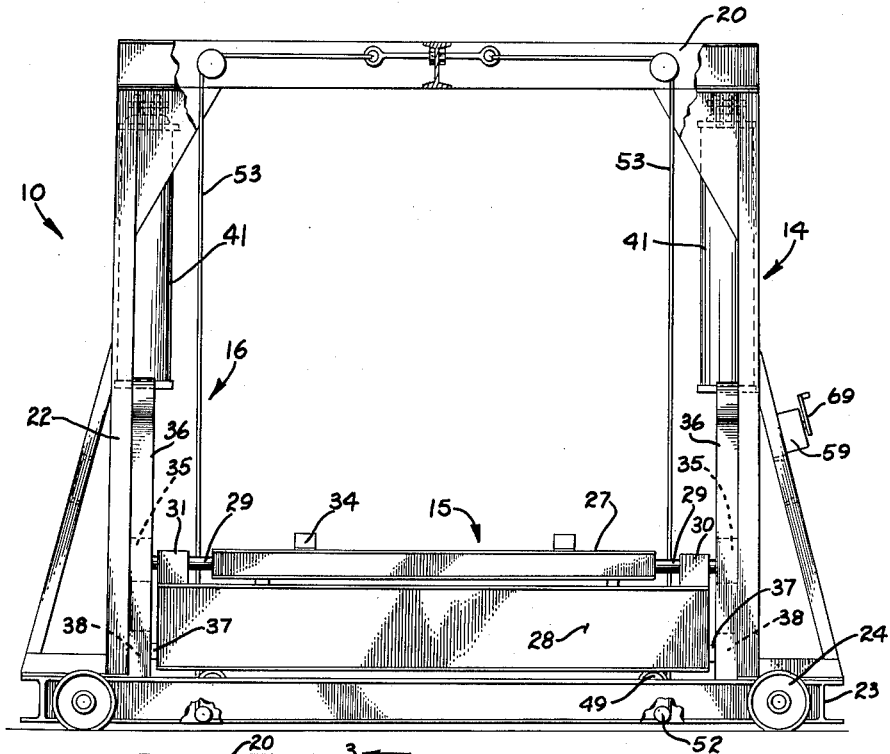
FIG. 1 is a back end view of a preferred embodiment of the elevating, mold dumping machine of this invention, which view shows the machine with portions of the outer structure removed to reveal inner structure.

The base 28 of the platform structure 15 in side view appears somewhat L-shaped. The shaft mountings 30 and 31 on each side are at the top of the L. In addition, the shaft 29 extends laterally of the base. On each end of the shaft 29 there is rotatably mounted a roller 35 which is disposed in a corresponding vertically disposed race 36 on the inner side of each back column structure 22 of the supporting framework assembly. At the bottom of the L-shaped base there is provided a horizontally disposed laterally extending shaft 37. Rotatably mounted on each end of the shaft 37 is a roller 38 which is also disposed in the corresponding race 36. On each side of the machine 10 the race 36, as shown in FIGS. 1 and 4, extends vertically upwardly and then curves upwardly and backwardly above the conveyor 13. The upper end of each race 36 is closed to limit the extent of movement of the top roller 35 therein. Also mounted on the bottom shaft 37 but within the base 28, as shown in FIG. 4, are the bottom ends of a pair of pressure cylinders 39. The piston rods 40 thereof extend out from the top ends of the cylinders 39 and are pivotally secured to the pivot shaft 32. With the platform structure 15 in normal, pallet car receiving position, as in FIG. 2, the piston rod 40 in each case is in extended position. It is preferred that the normally extended position of each piston rod 40 be such as to maintain the front end of the table 27 at a slightly higher elevation than the back end of the table 27 so that the table 27 in car receiving position has a slight tilt towards the back end thereof.

The base 28, forwardly of the bottom shaft 37 and preferably at a lower elevation than said bottom shaft, is associated with the lift mechanism 16.

Figure 6:
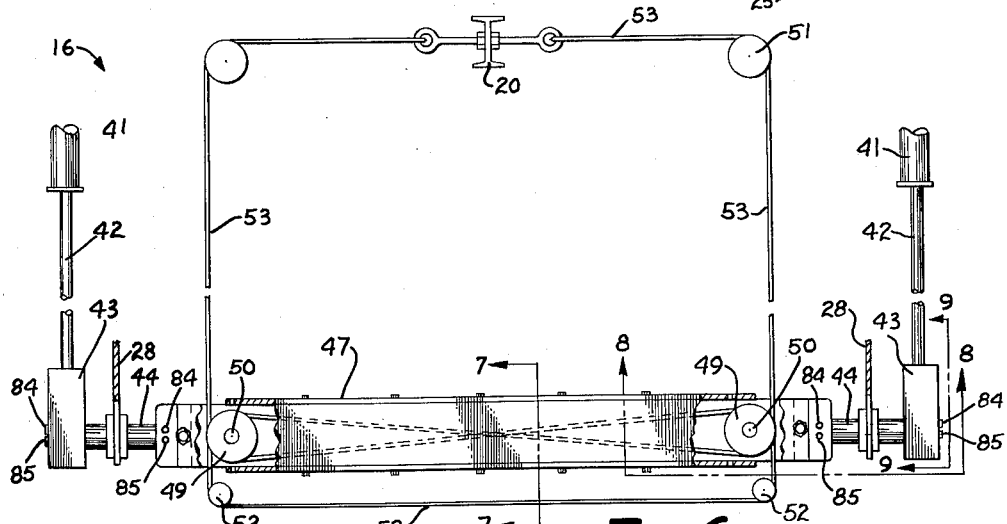
FIG. 6 is a back view of the elevating or lift mechanism of the machine of FIG. 1.
Figure 7:
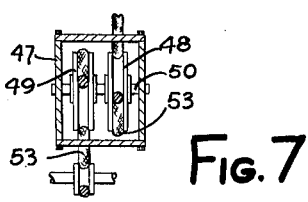
FIG. 7 is a sectional view taken as indicated by the cutting plane 7—7 of FIG. 6.

The lift mechanism 16 comprises a lift cylinder 41 vertically disposed on each side of the mold dumping machine 10. As shown in the drawings, each lift cylinder is positioned with the piston rod 42 thereof directed downwardly. The top end of each lift cylinder 41 is pivotally mounted to the overhead beam structure 20. The piston rod 42 of each lift cylinder 41 is secured at the bottom end thereof to a mounting block 43. As shown in FIGS. 6, 8 and 9, the mounting block 43 in each case has a horizontally disposed hole therethrough in which is seated an inwardly extending spindle 44. In this regard, it will be noted in FIG. 9 that the outer end of the spindle 44 is provided with a key slot 45 and that the hole in the mounting block 43 has a key 46 seated in the slot 45 to key the spindle 44 to the mounting block 43. As shown in FIGS. 6 and 8, the corresponding side front portions of the base 28 are pivotally mounted on spindles 44 whereby the base 28 is associated with the lift mechanism 16. The key 46 and slot 45 combination prevent rotation of the spindle 44 in the mounting block 43.

The lift mechanism 16 also involves a cable and pulley system to enable the platform structure 15 to be lifted and lowered smoothly and evenly. The cable and pulley system involves a generally hollow boom structure 47 between the inner sides of the base 28. The ends of the boom structure 47 are nonrotatably secured to the spindles 44 as shown in FIGS. 6 and 8. Mounted on the inside of the boom structure 47, in the region of each end thereof, are pulleys 48 and 49. The pulleys are rotatably mounted adjacent one another on a horizontally disposed, front-to-back aligned, shaft 50. As shown in FIGS. 5 and 6, adjacent each side of the machine 10 a grooved shaft 51 having a horizontally disposed, front-to-back aligned axis is nonrotatably secured to the overhead beam structure 20. The purpose of the grooved shaft 51 is to prevent the cables from fraying and to hold the cables in alignment with pulleys 48 and 49. In addition, a grooved shaft 52 with a horizontally disposed, front-to-back aligned axis is nonrotatably secured below the boom structure 47 to the bottom beam structure 23. A cable 53 is provided, both ends of which are secured midway of the sides of the machine as shown in FIG. 1 to the overhead beam structure 20. Looking at FIG. 6, it will be seen that the cable 53, starting at the right end thereof, drapes over the right-hand overhead grooved shaft 51 and extends downwardly to the boom structure 47. Here the cable 53 passes through a suitable opening in the top of the boom structure 47, under the right-hand pulley 49 and across to the left-hand pulley 49. Here the cable 53 drapes over the left-hand pulley 49 and passes downwardly through a suitable opening in the bottom of the boom structure 47 to the left-hand bottom grooved shaft 52. The cable 53 then extends across to the right-hand bottom grooved shaft 52 and then upwardly through a suitable opening in the bottom of the boom structure 47 to the right-hand pulley 48. Within the boom structure 47 the cable 53 drapes over the right-hand pulley 48 and across to the bottom of the left-hand pulley 49. The cable 53 then passes around the left-hand pulley 49 and then upwardly through a suitable opening in the top of the boom structure 47 to the left-hand side overhead grooved shaft 51. Here the cable 53 drapes over the shaft and passes to its attachment to the overhead cross structure 20.

The auxiliary car delivery track 17 is provided to bridge the gap between the stationary car delivery track 11 and the table track 33 when the table 27 is in car receiving position. The rails of the auxiliary car delivery track 17 are mounted on the support framework assembly 14 with the front ends thereof in alignment with and adjacent to, the ends of the stationary car delivery track 11. The backs ends of the rails of the auxiliary car delivery track 17 are positioned to be in alignment with, and adjacent to, the front ends of the rails of the table track 33 when the table 27 is in car receiving position.

The auxiliary car return track 18 is likewise mounted on the supporting framework assembly 14. The front end of each rail of the auxiliary car return track 18 is so mounted as to be in alignment with, and adjacent to, the back end of each rail of the stationary car return track 12. The back end portion of each rail of the auxiliary car return track 18, as shown in FIG. 5, is downwardly inclined from the receiving end thereof toward the discharge end thereof. With the platform structure 15 in down position and with the front portion of the table 27 tilted downwardly, the front ends of the rails of the table track 33 are in alignment with, and adjacent to, the upwardly disposed, receiving ends of the rails of the auxiliary car return track 18.

The lift mechanism 16 also involves a fluid pressure system for actuating the same. The fluid pressure system may be of the compressed air type, of the hydraulic fluid type and of the compressed air-hydraulic fluid type. The type of system selected for purposes of illustrating a preferred embodiment of this invention is of the compressed air type.

With reference to FIG. 10, it will be observed that the fluid pressure system comprises a compressed air supply conduit 55 which is intended to be coupled to a compressed air supply hose which trails along with the machine 10 and which is connected at the other end to a source of compressed air, or to be coupled to a compressed air outlet at the mold dumping station. The other end of the compressed air supply conduit 55 is connected, as by a T-coupling, to a pair of branch compressed air supply conduits 56 and 57 which are connected respectively to the inlet ports of two four-way valves 58 and 59.

The four-way valve 58 is provided with an inlet port 60, a constricted exhaust port 61, a pair of outlet ports 62 and 63 and a valve handle 64 for moving the valve body into the desired position.

The four-way valve 59 has a similar structure, being provided with an inlet port 65, a constricted exhaust port 66, a pair of outlet ports 67 and 68 and a valve handle 69 for moving the valve body into the desired position.

The piping arrangement for the lift cylinders 41 involves retract-air piping and extend-air piping. The retract-air piping comprises a retract-air, main conduit 70 coupled at one end to the outlet port 62 of the valve 58 and coupled at the other end to a pair of retract-air branch conduits 71 and 72. The retract-air branch conduits 71 and 72 are in turn coupled to the corresponding piston retract-air inlets of the lift cylinders 41. The extend-air piping involves an extend-air, main conduit 73 with one end thereof coupled to the other outlet port 63 of the four-way valve 58. The other end of the extend-air main conduit is coupled by a T-coupling to a pair of extend-air branch conduits 74 and 75, each of which is coupled to the corresponding, piston extend-air inlets of the lift cylinders 41.

The piping arrangement for the platform cylinders 39 involves a retract-air system and an extend-air system. The retract-air system involves a retract-air main conduit 77 with one end thereof coupled to the outlet port 67 of the valve 59 and the other end coupled to a pair of retract-air branch conduits 78 and 79. The branch conduits are in turn coupled to the corresponding piston retract-air inlets of the cylinders 39. Similarly, the extend-air system involves a main conduit 80 coupled to the other outlet port 68 of the valve 59 and at the other end coupled to a pair of extend-air branch conduits 81 and 82 which are associated with corresponding extend-air inlets of the return cylinders 39.

As shown in FIG. 10, those portions of the conduits which will move upon extension and retraction of the lift cylinder piston rods 42 and platform cylinder piston rods 40 comprise flexible compressed air hose sections.

In addition, with reference to the platform cylinder 39 air system, the branch conduits 78, 79, 81 and 82 involve a portion of the spindles 44. As each end of the spindles 44, as illustrated in FIGS. 8, 9 and 10, there are provided a pair of bores 84 and 85 which extend inwardly parallel to the axis of the spindles 44 to the region of the platform cylinders 39 and then turn at right angles toward the back of the boom 47. Coupled to the end of the bore 84 is the lead-in portion of the retract-air branch conduit 78 or 79 as the case may be. Coupled to the inner or backside end of the bore 84 is the terminal section of the retract-air branch conduit 78 or 79 as the case may be. Coupled to the outer end of the bore 85 is the lead-in portion of the extend-air branch conduit 81 and 82, as the case may be, while at the inner or backside end of the bore 85 there is coupled thereto the terminal section of the extend-air branch conduits 81 or 82.

Means may be provided in conjunction with the compressed air system and in conjunction with the platform structure 15 to limit the extent the platform structure 15 is elevated and lowered by the lift cylinder 41 and the extent the front end of the table 27 is raised or lowered. In the machine 10 of the drawings, however, such means are not provided relative to the table 27. Reliance is placed on the natural stroke of the piston rods 40 in the cylinders 39. On the other hand, such means are provided relative to the platform structure 15. As already mentioned and as shown in FIG. 4, the upper end of each race 36 is closed. Hence, upward movement of the platform structure 15 is limited thereby. To limit the extent of downward movement of the front of the platform structure 15 there is provided a bracket 87 mounted on the bottom beam structure 23 underneath the front end of the base 28. The front end of the base 28 is provided with a cross beam 88 between the sides thereof, which cross beam rests on the bracket 87 when the platform structure 15 is in down position. The bottom of the races 36 limits the extent of downward travel of the back of the platform structure 15.

Means may also be provided for limiting the extent of forward travel of the pallet car 19 until the table 27 has reached its car discharge position. Such means have not been provided on the machine 10 illustrated, however, because of the rapid action of the platform cylinders 39 involved, which makes such means unnecessary in this case.

Means are also provided for locking the mold dumping machine 10 in position at each foundry dumping station. Such means comprise a latch assembly 90 which involves a bolt 91 slidably mounted on a bracket 92 secured to the supporting framework assembly 14. At each station there is provided a bracket 93 with a corresponding bolt receiving hole for alignment purposes.

*Operation*

To use the machine 10, it is manually rolled into position on the track 25 at a desired mold dumping station. Where rail blocks have been placed on the stationary car delivery track 11 to prevent loaded pallet cars from rolling off the end thereof, the blocks are removed. If the pressure fluid system is of the type requiring the compressed air supply conduit 55 to be coupled to a compressed air outlet at the station, such coupling is made.

A loaded pallet car 19 is then moved from the stationary car delivery track 11 over the auxiliary car delivery track 17 onto the platform track 33 to the limit imposed by the stop members 34.

The valve handle 64 of valve 58 is then moved to direct compressed air from the valve inlet port 60 through the valve outlet port 62 into the retract-air system of the lift cylinders 41. By such manipulation of the valve handle 64, the constricted exhaust port 61 is placed in communication with the valve outlet port 63 whereby the extend-air system of the lift cylinders is in condition to be exhausted. This causes the piston rods 42 of the lift cylinders 41 to be retracted whereby the platform structure 15 is lifted. As the rollers 35 and 38 move upwardly in the race 36 while the piston rods 40 of the platform cylinders 39 remain stationary, the front of the table 27 tilts upwardly. When the top rollers 35 reach the ends of the backwardly and upwardly curved portions of the races 36, the table 27 and thus the pallet car 19 are tilted to the maximum. At such a tilt, a mold 97 on the cart is compelled under the influence of gravity to fall off the car 19 into the conveyor 13 as indicated by the arrow 98 in FIG. 4.

As soon as the mold 97 has fallen off the pallet car 19, the valve handle 64 on the four-way valve 58 is manipulated into position whereat compressed air from the valve inlet port 60 is directed into the valve outlet port 63 and thus into the extend-air system for the lift cylinders 41. At the same time, the outlet port 62 is brought into communication with the constricted exhaust port 61 whereby the retract-air system for the lift cylinders 41 is in condition to be exhausted. This causes the lift shafts 40 of the lift cylinders 41 to be extended, thereby lowering the platform structure 15 downwardly into its car receiving position as determined by the bottom rollers 38 in the races 36 and by the cross beam 88 and the bracket 87.

When the platform structure 15 has reached its car receiving position, the valve handle 69 of the four-way valve 59 is manipulated so as to bring the valve inlet port 65 into communication with the valve outlet port 67 and the constricted exhaust port 66 into communication with the valve outlet port 68. In such fashion, compressed air from the compressed air supply conduit 55 is introduced into the retract-air system of the platform cylinders 39. In addition, the extend-air system of the platform cylinders 39 is in condition to be exhausted. This results in the piston rods 40 of the platform cylinders 39 being retracted and causes the front end of the table 27 to tilt downwardly until the rails of the platform track 33 are in alignment and registration with the back ends of the rails of the auxiliary car return track 18. At this position, the car return position, the empty pallet car 14 rolls off the platform 27 onto the auxiliary car return track 18. Because of the inclination of the back portion of the rails of the auxiliary car return track 18, the impetus given to the empty car is sufficient to carry it across the auxiliary car return track 18 onto the stationary car return track 12.

Thereupon, the valve handle 69 is manipulated so as to bring the valve outlet port 68 into communication with the valve inlet port 65 and the valve outlet port 67 into communication with the constricted exhaust port 66. As a result, the extend-air system of the platform cylinders 39 is supplied with compressed air from the compressed air supply conduit 55 and the retract-air system of the platform cylinder 39 is exhausted. This causes the pistons of the return cylinders 39 to be extended whereby the front end of the table 27 is elevated to its car receiving position relative to the auxiliary car delivery track 17.

When a sufficient number of pallet cars have been unloaded at one foundry mold dumping station, and it is desired to move the machine 10 to another station, the rail blocks, if any, are erected, the bolt of the latch assembly is retracted and, if the compressed air supply conduit 55 is coupled to a compressed air outlet at the station, the compressed air supply conduit 55 is uncoupled from said outlet. The machine 10 is then manually rolled over the track 25 to the next desired foundry mold dumping station.

Thus, there is provided a mold dumping machine which can be readily moved from one foundry mold dumping station to another.

A feature of advantage is that the machine functions to transfer the load from a loaded pallet car at one elevation to a conveyor at a higher elevation and then places the unloaded pallet car on a car return track at a lower elevation.

Another feature of advantage is that the machine can be operated by persons of little skill. Still another advantage of the machine is that it is safe in operation.

Other features and advantages of the mold dumping machine of this invention will be apparent to those in the exercise of ordinary skill in the art upon reading the foregoing description.

This invention may be embodied in several forms without departing from the spirit and essential characteristics thereof. The embodiment just described is therefore illustrative and not restrictive, since the scope of the invention is defined by the appended claims rather than by the description preceding them, and all changes that fall within the metes and bounds of the claims are therefore intended to be embraced by those claims.

I claim:

1. A movable dumping machine for dumping objects carried by pallet cars comprising: a movable frame; a plurality of first and second track means; a platform mounted on said frame for vertical movement with respect thereto; means for laterally aligning said frame with respect to said track means in such a manner that pallet cars may be conveyed between said platform and said track means; means for vertically aligning said platform with respect to said track means so as to enable it to receive a pallet car from one of said first track means; means on said frame for imparting substantially vertical motion to said platform; guide means on said frame for guiding said platform and tilting said platform in a first direction at a predetermined point in its vertical movement; retaining means on said platform for retaining said car on said platform when said platform is tilted in said first direction; and means operatively connected between said vertical aligning means and said platform for tilting said platform in a second direction, said platform when tilted in said second direction being vertically aligned with one of said second track means and inclined in such a manner as to discharge a pallet car on said platform onto said second track means.

2. A dumping machine for dumping objects carried by pallet cars comprising: a frame; a platform; movably mounted on said frame and alignable with first track means to receive a pallet car therefrom; means on said frame for imparting substantially vertical motion to said platform, guide means on said frame including an upwardly and outwardly curved channel above the level of said first track means for guiding one end of said platform and tilting said platform in a first direction at a predetermined point in its vertical movement; retaining means on said platform for retaining said car on said platform when said platform is tilted in said first direction; and means interconnecting said motion imparting means and said platform and movable with said platform for tilting said platform in a second direction, said platform when tilted in said second direction being aligned with second track means positioned below said first track means, and being inclined so as to discharge a pallet car on said platform onto said second track means.

3. A dumping machine for dumping objects carried by pallet cars comprising: a platform alignable in a first position, with first track means to receive a pallet car therefrom, a vertically acting hydraulic element for raising above said platform above said first position, guide means including a curved channel for guiding said platform and tilting said platform in a first direction at a predetermined point in its rising movement, retaining means for retaining said car on said platform when said platform is tilted in said first direction, and pivotally mounted hydraulic means associated with said platform and movable therewith for tilting said platform in a second direction with respect to said guide means, said platform when tilted in said second direction being alignable by said hydraulic element with second track means and being inclined so as to discharge a pallet car on said platform onto said second track means.

4. A dumping machine for dumping objects carried by pallet cars comprising: a platform, means for vertically moving said platform into alignment with first track means to receive a pallet car therefrom, means for holding said platform level in the direction perpendicular to said track means during the vertical motion of said platform, guide means including a curved channel closed at its upper end for guiding said platform and tilting said platform in a first direction at a predetermined point in its vertical movement, retaining means for retaining said car on said platform when said platform is tilted in said first direction, and means movable with said platform for tilting said platform in a second direction with respect to said guide means, said platform when tilted in said second direction being aligned with second track means and being inclined so as to discharge a pallet car on said platform onto said second track means.

5. A movable dumping machine for dumping objects carried by pallet cars delivered on a first track means and returnable on a second track means comprising; a movable frame alignable with said first track means; a pallet car supporting platform mounted on said frame; power means connecting said frame and said platform for raising said platform from the level of said first track means to a higher level; cam means on one end of said platform; cam track means on said frame extending upwardly and then upwardly and outwardly of said frame; said cam and cam track means cooperating with one another to tilt and thereby unload a pallet car supported by said platform when said platform is raised to said higher level; and power means for lowering the second end of said platform to align it with said opposite track means for return of said pallet car.

6. A conveyor and dumping system comprising a plurality of horizontally spaced pallet car conveyors; each of said conveyors having a delivery track means and a lower return track means; a connecting path transverse to and adjacent the terminal ends of said conveyor; a portable dumper movable along said connecting path; said dumper comprising a frame; means for aligning said frame with any one of said terminal conveyor ends; platform pallet car receiving means vertically alignable with the delivery track of one of said conveyors; power means connected between said frame and platform for raising said platform to a level higher than that of said delivery track; cam and cam follower means associated with one and the other of said platform and said frame, respectively, to tilt said platform at a predetermined point in its rising motion to thus discharge the pallet car load; a second power means associated with said platform for tilting said platform downwardly to thereby align it with said return track on said one conveyor for returning a pallet car.

7. A dumping machine for dumping an object carried by a pallet car, which comprises: a frame; support means on said frame alignable with a car delivery track at a first elevation to receive a loaded pallet car therefrom; first power means operatively connected between said frame and said car for elevating said car entirely to a position at a higher elevation; cam track means on said frame arranged to tilt said car as it is raised to said higher elevation to cause said object to slide off said car; and second power means operatively connected between said frame and said support means for inclining said support means into alignment with a car return track at an elevation below said first elevation so as to deliver said car to said return track.

8. A device for dumping molds from mold carrying pallet cars in foundries comprising: a plurality of parallel car delivery tracks each disposed directly above a car return track, all of said tracks terminating generally in a common vertical plane; a lateral track adjacent said plane and parallel thereto; a mold dumping machine movable along said lateral track for selective alignment with each of said delivery tracks and with the return track disposed therebelow, said machine including a frame; support means for receiving a mold carrying pallet car from a car delivery track at one elevation; first power means connected between said car and said frame for elevating said car entirely to a higher elevation; means connected between said frame and said car for tilting said car to dump said mold at said higher elevation; second power means independent of said first power means acting between said frame and said support means to incline said support means so as to deliver said car to a car return track at a lower elevation; means for moving said machine on said lateral track from one mold dumping station to another dumping station; and means for releasably locking said machine against lateral movement in alignment with a selected delivery track and return track.

9. A dumping machine for dumping objects carried by pallet cars comprising: a frame; a platform vertically movable with respect to said frame, said platform being alignable with first track means to receive a pallet car therefrom, first power-operated means on said frame for imparting substantially upward vertical motion to said platform, guide means on said frame for guiding said platform and tilting said platform in a first direction at a predetermined point in its upward movement, retaining means associated with said platform for retaining said car on said platform when said platform is tilted in said first direction, and second power-operated means connected between said first power-operated means and said platform but independent of said first power-operated means for tilting said platform in a second direction, said platform when tilted in said second direction being aligned with second track means and being inclined so as to discharge a pallet car on said platform onto said second track means.

References Cited in the file of this patent

UNITED STATES PATENTS

| | | |
|---|---|---|
| 946,636 | Greene | Jan. 18, 1910 |
| 976,170 | Greene | Nov. 22, 1910 |
| 1,065,325 | Greene | June 17, 1913 |
| 1,893,273 | Constable | Jan. 3, 1933 |
| 2,411,228 | Poulsen | Nov. 19, 1946 |
| 2,681,738 | Granath | June 22, 1954 |

UNITED STATES PATENT OFFICE
CERTIFICATE OF CORRECTION

Patent No. 3,065,872                              November 27, 1962

Bernard G. Witte

It is hereby certified that error appears in the above numbered patent requiring correction and that the said Letters Patent should read as corrected below.

Column 1, line 67, for "pellet" read -- pallet --; column 2, line 37, for "registry" read -- register --; line 72, for "1" read -- 14 --; column 4, line 38, for "auxiliary" read -- auxiliary --; column 8, line 15, after "platform" strike out the semi-colon; line 37, strike out "above", first occurrence; column 9, line 5, for "second" read -- opposite --; line 6, for "opposite" read -- second --.

Signed and sealed this 24th day of September 1963.

(SEAL)
Attest:

ERNEST W. SWIDER                                  DAVID L. LADD
Attesting Officer                                 Commissioner of Patents